(12) United States Patent
Kusumoto et al.

(10) Patent No.: US 7,006,174 B2
(45) Date of Patent: Feb. 28, 2006

(54) POLARIZING FILM POLARIZING PLATE AND LIQUID CRYSTAL DISPLAY

(75) Inventors: Seiichi Kusumoto, Ibaraki (JP); Takashi Shouda, Ibaraki (JP)

(73) Assignee: Nitto Denko Corporation, Ibaraki (JP)

(*) Notice: Subject to any disclaimer, the term of this patent is extended or adjusted under 35 U.S.C. 154(b) by 89 days.

(21) Appl. No.: 10/068,094

(22) Filed: Feb. 5, 2002

(65) Prior Publication Data

US 2002/0113922 A1 Aug. 22, 2002

(51) Int. Cl.
*G02F 1/1335* (2006.01)
(52) U.S. Cl. ......................... 349/96; 359/491
(58) Field of Classification Search .................. 349/96, 349/117, 122, 84; 359/490, 491, 492, 502
See application file for complete search history.

(56) References Cited

U.S. PATENT DOCUMENTS 5,087,985 A * 2/1992 Kitaura et al. .............. 359/350
5,925,289 A * 7/1999 Cael et al. .................. 252/585
6,033,743 A * 3/2000 Suzuki et al. ................... 428/1
6,610,356 B1 * 8/2003 Kausch et al. ........... 427/163.1

FOREIGN PATENT DOCUMENTS

| JP | 56-048601 | | 5/1981 |
| JP | 401078236 A | * | 3/1989 |
| JP | 2001-091736 | * | 4/2001 |
| JP | 2001091736 | | 4/2001 |

* cited by examiner

*Primary Examiner*—Dung T. Nguyen
*Assistant Examiner*—Thoi V. Duong
(74) *Attorney, Agent, or Firm*—Westerman, Hattori Daniels & Adrian LLP

(57) ABSTRACT

A polarizing film comprising a stretched film containing iodine, wherein an absorbance characteristics ratio of ((an absorption peak A in a wavelength range of 550 to 650 nm)/(an absorption peak B in a wavelength range of 450 to 520 nm)) is no more than 1.5 when the polarizing film is arranged in a crossed Nicol, form a liquid crystal display for color display that provides as neutral hue as possible, and gives good black color display, and as a result gives an outstanding reproducibility of color.

30 Claims, 1 Drawing Sheet

POLARIZING FILM POLARIZING PLATE AND LIQUID CRYSTAL DISPLAY

BACKGROUND OF THE INVENTION

1. Field of the Invention

The present invention relates to an iodine contained polarizing film and a polarizing plate using the same, suitable for assembling a liquid crystal display for color display having an outstanding color reproducibility.

2. Description of the Background Art

In the past, a polarizing film is known in which iodine is impregnated into hydrophilic polymer films and then the films are stretched. This type of polarizing film is used for a liquid crystal display etc., and, in that case, it is required to realize as perfect as possible display of black color in order to obtain a color display with outstanding color reproducibility.

Although the above-mentioned perfect display of black color may be realized using a polarizing film that provides a neutral hue when arranged in a crossed Nicol configuration, a polarizing film in the past did not give a neutral hue when arranged in a crossed Nicol configuration, but a trouble was observed in which a strong coloring is generated resulting from a leakage light.

An object of the present invention is to develop an iodine contained polarizing film that may provide as neutral as possible hue when arranged in a crossed Nicol configuration, and that may be used for assembling a liquid crystal display for color display providing a good black display and further an outstanding color reproducibility.

SUMMARY OF THE INVENTION

The aforesaid object of the present invention has been achieved by the following.

1. A polarizing film comprising a stretched film containing iodine, wherein an absorbance characteristics ratio of ((an absorption peak A in a wavelength range of 550 to 650 nm)/(an absorption peak B in a wavelength range of 450 to 520 nm)) is no more than 1.5 when the polarizing film is arranged in a crossed Nicol configuration.

2. A polarizing plate comprising the polarizing film in the above-mentioned 1 and a transparent protective layer on one side or both sides of the said polarizing film.

3. The polarizing plate in the above-mentioned 2, comprising a hard coating layer on an external surface of the transparent protective layer of the polarizing plate.

4. The polarizing plate in the above-mentioned 3, the hard coating layer comprises a transparent particle in dispersed state.

5. The polarizing plate in the above-mentioned 2, comprising an adhesive layer for adhesion with other members on one side or both sides thereof.

6. The polarizing plate in the above-mentioned 2, comprising at least one of a retardation plate and a brightness enhanced plate.

7. A liquid crystal display having a polarizing plate in the above-mentioned 2.

In accordance with the present invention a polarizing film having a good black color and an excellent neutral hue when it is arranged in a crossed Nicol configuration is obtained that may generate only a little amount of leakage light. And a liquid crystal display that may show a good black display and outstanding color reproducibility is realized. Moreover, since it is an iodine contained polarizing film, an excellent mass productivity is provided.

DESCRIPTION OF THE PREFERRED EMBODIMENTS

Figure 1:
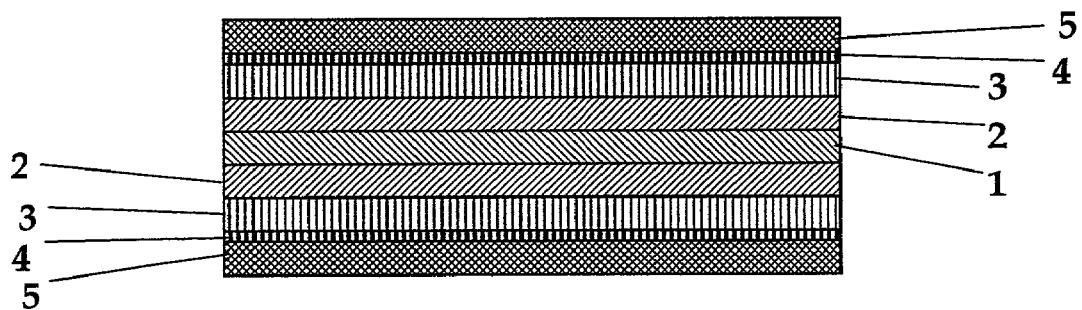
FIG. 1 is a sectional drawing of Example.

A polarizing film of the present invention comprises a stretched film containing iodine, wherein an absorbance characteristics ratio of ((an absorption peak A in a wave length range of 550 to 650 nm)/(an absorption peak B in a wave length range of 450 to 520 nm)) is no more than 1.5 in case of having been arranged in a crossed Nicol configuration.

A polarizing film preferable in order to reduce a leakage light and to obtain a strong black color i.e., to obtain a neutral hue when arranged in a crossed Nicol configuration, is a polarizing film in which the above mentioned absorption peak A especially absorption peak A in a wave length range of 580 to 620 nm and an absorption peak B especially an absorption peak B in a wave length range of 460 to 490 nm have a relationship that a ratio of ((an absorption peak A)/(an absorption peak B)) is no more than 1.4, preferably no more than 1.3, and more preferably no more than 1.2. If the peak ratio exceeds 1.5, much leakage light is generated and a strong coloring caused by the leakage light will be given, and display quality of black color display will be significantly decreased, in case of having been arranged in a crossed Nicol configuration.

A polarizing film of the present invention may be manufactured by suitable methods according to conventional methods such as wet method in which films comprising suitable hydrophilic polymers, such as polyvinyl alcohol derived film, partially formalized polyvinyl alcohol derived film, and ethylene-vinyl acetate copolymer derived partially saponified film is conveyed and impregnated with iodine, and subsequently stretched within a dyeing bath. In this case, dichromatic materials other than iodine, such as dichromatic dyestuffs, may also be used together.

In the above the ratio of the above-mentioned ((an absorption peak A)/(an absorption peak B)) may be controlled by a method in which, for example, while a treating temperature during dyeing and stretching process in the dyeing bath is controlled in a range of 10 to 70° C., preferably of 15 to 60° C., and more preferably of 20 to 40° C., stretching process is performed so that a retardation of the film measured using a light having a wave length of 900 nm may not exceed 1100 nm, preferably the retardation may be in a range of 10 to 1050 nm, and more preferably in a range of 100 to 1000 nm.

In the above method a stretching ratio is not limited, but usually it is no more than 50%, preferably 1 to 20% and more preferably 2 to 10%, and a thickness of the polarizing film is usually 5 to 80 μm. A reason that an absorption peak ratio of the above-mentioned object by such a method is attained, that is, an improvement of neutral hue when having been arranged in a crossed Nicol configuration is attained is because a formation ratio of a poly iodine complex in the polarizing film is controlled.

That is, since this poly iodine complex has a strong absorption peak near a wave length range of 550 to 650 nm, and especially near a wave length range of 580 to 620 nm (an absorption peak A), and a strong absorption peak near a wave length range of 450 to 520 nm, and especially near a wave length range of 460 to 490 nm. (an absorption peak B) that have a significant influence on determination of a hue of polarizing film, a hue of the polarizing film may be adjusted by controlling a formation ratio of the poly iodine complex.

A polarizing film by the present invention may be preferably used for manufacturing of various kinds of optical equipments, such as a liquid crystal display, etc. In practical use, a polarizing plate may be constituted in which suitable functional layers, such as transparent protective layer, or one layer or two layers or more of optical layers may be prepared to one side or both sides of the polarizing film. An example is shown in FIG. 1. Referential number 1 shows a polarizing film, 2 a transparent protective layer, 3 a hard coating layer, 4 an adhesive layer, and 5 a separator.

Adding of the above-mentioned transparent protective layer has a purpose for improvement of water resistance and handling property of a polarizing film etc., and suitable transparent materials may be used for forming the transparent protective layers. The transparent protective layer may be made of plastics, excellent in transparency, mechanical strength, thermal stability, moisture shielding property and others. The plastics include, for example, polyester, acetate series resin, polyethersulfone, polycarbonate, polyamide, polyimide, polyolefin, or acrylic resin, or thermosetting or ultraviolet-curing resin such as acryl series, urethane series, acrylurethane series, epoxy series, or silicone series, or the like.

The transparent protective layer may be formed by a suitable method such as a method of coating a polymer or a method of laminating those made into films, and the thickness thereof may be suitably determined. The thickness is typically at most 500 μm, preferably from 1 to 300 μm, more preferably from 5 to 200 μm. Moreover, the transparent protective layer may also be constituted so that it may have fine undulating structure on the surface for the purpose of prevention of sticking and diffusion or anti-glare property.

For example, a method may be mentioned in which the fine undulating structure is formed on the surface of the transparent resin layer, using a suitable roughening method such as treating a suitable transparent particles such as inorganic fine particles made of silica, alumina, titania, zirconia, tin oxide, indium oxide, cadmium oxide, antimony oxide, or the like which may be electrically conductive, or organic fine particles made of a cross-linked or non-cross-linked polymer or the like in the transparent resin, sandblasting or matting. An average particle size of from 0.5 to 20 μm is to be used, and the amount of fine particles is typically from 2 to 25 parts by weight, preferably from 5 to 20 parts by weight, with respect to 100 parts by weight of the transparent resin.

On the other hand, a hard coating layer is prepared for the purpose to prevent surface damage etc., and is usually attached to an external surface of the transparent protective layer 2 as in example of FIGURE. A hard coating layer 3 is formed with suitable materials that have good hardness, and, generally is formed as a coating layer with curing type resins as in the above-mentioned transparent protective layer etc. In forming of the hard coating layer, transparent particles may also be contained in dispersed state for the purpose of anti-glare processing etc. as in the above-mentioned transparent protective layer.

Moreover, a polarizing plate may also have adhesive layers 4 for adhesion with other members such as liquid crystal cell etc. on one side or both sides as in example of figure. The adhesive substance or adhesive agent is no particular limited, can used a suitable one. An example thereof is an adhesive containing a suitable polymer such as an acryl series polymer, a silicone series polymer, polyester, polyurethane, polyamide, polyether, fluorine series polymer, or rubber series polymer, as a base polymer.

In particular, for forming an adhesive layer, it is preferable to use an adhesive being excellent in optical transparency, exhibiting adhesive characteristics of suitable wettability, cohesiveness, and adhesiveness, and being excellent in weather resistance, heat resistance, and the like, such as an acryl series adhesive. In addition to the above, the adhesive layer is preferably having a low moisture absorption and being excellent in heat resistance, in view of preventing a foaming phenomenon or a peeling phenomenon caused by moisture absorption, preventing decrease in the optical characteristics or warpage of the liquid crystal cell caused by thermal expansion difference or the like, hence the formability of a liquid crystal display having a high quality and being excellent in durability.

The adhesive layers may comprise, suitable additives such as natural and synthetic resins, especially tackifier, glass fibers, glass beads, fillers and pigments made of metal powders, other inorganic powders, and the like, coloring agents, and antioxidants, which can be blended in accordance with the needs. Further, an adhesive layer exhibiting an optical diffusion property can be made by allowing fine particles to be contained therein.

The adhesive layer can be attached onto the designated surface of the polarizing plate by a suitable method. Examples of the method include a method of preparing an adhesive solution of from 10 to 40 wt % by dissolving or dispersing an adhesive substance or a composition thereof into a solvent made of a single one or a mixture of suitable solvents such as toluene and ethyl acetate, and attaching the adhesive solution directly onto the designated surface of the polarizing plate by a suitable developing method such as the casting method or the application method, and a method of forming an adhesive layer on a separator in accordance with the above and transferring the adhesive layer onto the designated surface of the polarizing plate.

The adhesive layer can also be provided as superposed layers of those of different compositions, those of different kinds, or the like. The thickness of the adhesive layer can be suitably determined in accordance with the intended usage or the adhesive strength, and is typically from 1 to 500 μm, preferably from 5 to 200 μm, more preferably from 10 to 100 μm. The adhesive layers to be disposed on both side of the polarizing plate may be of the same composition or kind, or of different ones.

In addition, when the adhesive layer is exposed outside, it is preferable as is shown in Figure to adhere a separator 5 temporarily and to protect the adhesive layer from contamination etc. The separator can be formed, for example, by a method of providing a release coating layer made of a suitable release agent such as silicone series, long-chain alkyl series, fluorine series, or molybdenum sulfide on a suitable thin foliate in accordance with the needs, or the like method.

The aforesaid thin foliate to be used may be a suitable one known in the art, such as plastic film, rubber sheet, paper, cloth, nonwoven cloth, net, foamed sheet, metal foil, or a laminate body thereof. The thickness of the thin foliate can be suitably determined in accordance with the strength or the like, and is typically at most 500 μm, preferably from 5 to 300 μm, more preferably from 10 to 200 μm.

In addition, the above-mentioned separator may be a protective film for the purpose of damage prevention of a front face of a polarizing plate etc. That is, though a separator is configured so that it may be peeled on an interface with an adhesive layer adhered thereon; a protective film is configured so that it may be peeled with the adhesive layer when a thin film is peeled off from a polarizing plate. Therefore, a surface of the polarizing plate is exposed after peeling off the protective film.

In addition, a polarizing plate of the present invention may be configured as a layer in which suitable optical layers used for assembling of a liquid crystal display etc., such as an elliptical polarizing plate and a brightness enhanced polarizing plate in which a retardation plate or a brightness enhanced plate are laminated is added. Although these optical layers may be added and laminated separately by a successive manner in assembling processes of a liquid crystal display etc., optical layer added and laminated beforehand is stable in quality, and excellent in assembly operation property, etc. and therefore they have an advantage in manufacturing effectiveness of a liquid crystal display.

The kind of the optical layer to be added is not particularly limited. Therefore, the polarizing plate may be a reflecting type, or the like. Further, the retardation plate may be a half wavelength plate, a quarter wavelength plate, one having a suitable object such as viewing angle compensation, or the like. In the case of a laminate type such as the aforesaid elliptically polarizing plate, the lamination thereof may have been carried out via a suitable bonding means such as an adhesive layer.

On the other hand, the reflecting type polarizing plate is for forming a liquid crystal display or the like of a type such that the incident light from the viewing side (display side) is reflected for display. This has an advantage in that the incorporation of a light source such as a backlight can be omitted to facilitate fabrication of a liquid crystal display having a reduced thickness. The reflecting type polarizing plate may be formed by a suitable method such as a method of attaching a reflecting layer made of metal or the like onto one surface of a polarizing film, optionally via a transparent protective layer or the like.

A specific example of the reflecting type polarizing plate may be one in which a foil or a vapor-deposited film made of a reflecting metal such as aluminum is attached onto one surface of a transparent protective layer made of an optionally matted film or the like. The reflecting type polarizing plate may be one having a reflecting layer of a fine undulating structure on the aforesaid diffusing type transparent protective layer.

The aforesaid reflecting layer having a fine undulating structure has advantages such as preventing directivity or glittering appearance by diffusing the incident light by random reflection, thereby restraining the unevenness of brightness. The reflecting layer of a fine undulating structure reflecting the surface fine undulating structure of the transparent protective layer can be formed, for example, by attaching metal directly onto the surface of a transparent protective layer with the use of a suitable method of vapor deposition type such as the vacuum vapor deposition method, the ion plating method, or the sputtering method or plating type or the like.

Meanwhile, specific examples of the aforesaid retardation plate include birefringent films obtained by stretching a film made of a suitable polymer such as polycarbonate, polyvinyl alcohol, polystyrene, polymethyl methacrylate, polyolefin such as polypropylene, polyallylate, or polyamide, oriented film of liquid crystal polymer, and those in which an oriented layer of liquid crystal polymer is supported with a film.

The retardation plate may be, for example, one having a suitable retardation according to the intended usage, or may be a tilted orientation film with controlled refractive index in the thickness direction. Further, two or more kinds of retardation plates may be laminated to control the optical characteristics such as retardation. The aforesaid tilted orientation film can be obtained, for example, by a method of bonding a heat-shrinking film onto a polymer film and subjecting the polymer film to a stretching process and/or a shrinking process under the action of its shrinking force by heating, a method of obliquely orienting a liquid crystal polymer, or the like method.

The brightness enhanced plate is sometimes referred to as polarizing separating plate, and shows such a property that, when natural light is incident, a linearly polarized light of a predetermined polarizing axis or a circular polarized light in a predetermined direction is reflected, and the other light is transmitted. The brightness enhanced plate is used for the purpose of improving brightness in a liquid crystal display.

Namely, the brightness enhanced plate is used for the purpose of improving brightness by using a method such as allowing light from a light source such as a backlight to be incident into the brightness enhanced plate so as to obtain a transmitted light in a predetermined polarized state, and allowing the reflected light to be reversed via a reflecting layer or the like to be incident into the brightness enhanced plate again, and allowing all or part thereof to be transmitted as a light in a predetermined polarized state so as to increase the amount of light transmitted through the brightness enhanced plate as well as supplying a polarized light that is hardly absorbed by a polarizing plate so as to increase the amount of light that can be used for liquid crystal display or the like.

Therefore, as the brightness enhanced plate can be used a suitable plate, for example, that shows a property of transmitting a linearly polarized light of a predetermined polarizing axis and reflecting the other light, such as a multi-layer thin film of dielectrics or a multi-layer laminate of thin films having different refractive index anisotropies (D-BEF and others manufactured by 3M Co., Ltd.), or that shows a property of reflecting one of right and left circular polarized lights and transmitting the other light, such as a cholesteric liquid crystal layer, particularly an oriented film of cholesteric liquid crystal polymer or one in which the oriented liquid crystal layer is supported on a film base material (PCF350 manufactured by NITTO DENKO CORPORATION, Transmax manufactured by Merck Co., Ltd., and others).

In the aforesaid brightness enhanced plate of a type that transmits a linearly polarized light of a predetermined polarizing axis, the light can be efficiently transmitted while restraining the absorption loss by the polarizing plate, by allowing the transmitted light to be incident, as it is, into the polarizing plate with aligned polarized axis.

On the other hand, in the brightness enhanced plate of a type that transmits a circular polarized light, such as a cholesteric liquid crystal layer, it is preferable to allow the light to be incident into the polarizing plate after converting the transmitted circular polarized light into a linearly polarized light via a retardation plate instead of allowing the light to be incident, as it is, into the polarizing plate to restrain the absorption loss. The circular polarized light can be converted into a linearly polarized light by using a quarter wavelength plate as the retardation plate and disposing the plate between the polarizing plate and the brightness enhanced plate.

A retardation plate that functions as a quarter wavelength plate in a wide wavelength range such as a visible light region can be obtained by a method such as superposing a retardation layer that functions as a quarter wavelength plate to a monochroic light such as a 550 nm wavelength light, onto a retardation layer that shows a different retardation characteristics, for example, a retardation layer that functions as a half wavelength plate. Therefore, the retardation plate to be disposed between the polarizing plate and the brightness enhanced plate may be made of one or more layers of retardation layers.

Also, as to the cholesteric liquid crystal layer, one can obtain a layer that reflects a circular polarized light in a wide wavelength range such as a visible light region by providing a configuration structure in which two or more layers are superposed using a combination of layers having different reflection wavelengths.

The transparent protective layer, the hard coating layer, the adhesive layer, the retardation plate, or the brightness enhanced plate constituting the polarizing plate may be allowed to have an ultraviolet absorbing capability by a method of treating with a ultraviolet absorber such as a salicylic acid ester series compound, a benzophenol series compound, a benzotriazol series compound, a cyanoacrylate series compound, or a nickel complex salt series compound.

The polarizing film and polarizing plate of the present invention may be preferably used for manufacturing various equipments, such as liquid crystal displays, etc. The liquid crystal display may be manufactured as an equipment that has a suitable conventional configuration, such as a transmission type, a reflective type, or a type of both for transmission/reflective in which the polarizing film and the polarizing plate of the present invention are configured on one side or both sides of a liquid crystal cell.

EXAMPLE

Example 1

A polyvinyl alcohol film with a thickness of 80 μm was stretched in a water bath in which iodine is dissolved at ordinary temperature to form a polarizing film. Stretching processing was carried out while a retardation is controlled by measuring the retardation through light of a wave length of 900 nm using an automatic birefringence meter (made by Oji Scientific Instruments). A triacylcellulose film was adhered on both sides through a polyvinyl alcohol derived adhesive layer, and a polarizing plate with a thickness of about 180 μm was obtained.

The above-mentioned polarizing plate was arranged in a crossed Nicol configuration, and an absorbance characteristic was measured with a spectrophotometer (made by Shimadzu Corporation), and absorption peaks were observed at a wave length of 610 nm (peak A), and of 480 nm (peak B). The peak ratio (A/B) was 0.96.

Example 2

A polarizing plate that has a peak ratio of 1.04 was obtained in the same way as in Example 1.

Example 3

A polarizing plate that has peak ratio of 1.17 was obtained in the same way as in Example 1.

Example 4

A polarizing plate that has peak ratio of 1.37 was obtained in the same way as in Example 1.

Comparative Example

A polarizing plate that has peak ratio of 2.12 was obtained in the same way as in Example 1.

Evaluation Examination

Two of polarizing plates obtained in Examples and Comparative example were adhered so that absorption axis may be configured parallel (for white display) or orthogonal (for black display). Visual observation of the transmitted light or reflected light was carried out, and white and black display index were investigated. Results are shown in the following table. In addition, evaluation is based on the following criteria.

White display index

Excellent: Good white color obtained
Good: Coloring that does not have a trouble in display quality although it is not white
Failure: Coloring in which yellowish color is strong and display quality is reduced remarkably Black display index Excellent: Good black color obtained
Good: Coloring that does not have a trouble in display quality although black color is reduced a little and is bluish
Failure: Coloring in which black color display is bluish and display quality is remarkably reduced

|  | Example 1 | Example 2 | Example 3 | Example 4 | Comparative example |
|---|---|---|---|---|---|
| White display index | Excellent | Excellent | Excellent | Excellent | Excellent |
| Black display index | Excellent | Excellent | Excellent | Good | Failure |

What is claimed is:

1. A polarizing film comprising a non-UV-treated stretched film containing iodine, wherein an absorbance of said polarizing film comprises an absorption peak A in a wavelength range of 550 to 650 nm and an absorption peak B in a wavelength range of 450 to 520 nm, and an absorbance characteristics ratio of (absorption peak A/absorption peak B) is no more than 1.5, wherein the absorbance peaks are measured after arranging the polarizing film in a crossed Nicol.

2. A polarizing plate comprising the polarizing film according to claim 1 and a transparent protective layer on one side or both sides of the said polarizing film.

3. The polarizing plate according to claim 2, comprising a hard coating layer on an external surface of the transparent protective layer of the polarizing plate.

4. The polarizing plate according to claim 3, the hard coating layer comprises a transparent particle in dispersed state.

5. The polarizing plate according to claim 3, comprising an adhesive layer for adhesion with other members on the hard coating layer.

6. The polarizing plate according to claim 5, comprising at least one of a retardation plate and a brightness enhanced plate on the adhesive layer.

7. The polarizing plate according to claim 2, wherein the thickness of the transparent protective layer is from 5 to 200 μm.

8. The polarizing plate according to claim 2, wherein the transparent protective layer contains transparent particles selected from the group consisting of inorganic fine particles made of silica, alumina, titania, zirconia, tin oxide, indium oxide, cadmium oxide, antimony or oxide, and organic fine particles made of a cross-linked or non-cross-linked polymer.

9. The polarizing plate according to claim 2, comprising an adhesive layer for adhesion with other members on one side or both sides thereof.

10. The polarizing plate according to claim 9, wherein the adhesive layer comprises at least one of an acryl series polymer, a silicone series polymer, polyester, polyurethane, polyamide, polyether, fluorine series polymer, and rubber series polymer.

11. The polarizing plate according to claim 2, comprising at least one of a retardation plate and a brightness enhanced plate.

12. A liquid crystal display having a polarizing plate according to claim 2.

13. The liquid crystal display according to claim 12, wherein the polarizing plate comprises a hard coating layer on an external surface of the transparent protective layer.

14. The liquid crystal display according to claim 13, wherein the hard coating layer comprises a transparent particle in dispersed state.

15. The liquid crystal display according to claim 12, wherein the polarizing plate comprises an adhesive layer for adhesion with other members on one side or both sides thereof.

16. The liquid crystal display according to claim 12, wherein the polarizing plate comprises at least one of a retardation plate and a brightness enhanced plate.

17. The polarizing film according to claim 1, wherein the absorbance characteristics ratio is no more than 1.4.

18. The polarizing film according to claim 1, wherein the absorbance characteristics ratio is no more than 1.3.

19. The polarizing film according to claim 1, wherein the absorbance characteristics ratio is no more than 1.2.

20. The polarizing film according to claim 1, having a stretching ratio of no more than 50%.

21. The polarizing film according to claim 1, having a stretching ratio of from 1 to 20%.

22. The polarizing film according to claim 1, having a stretching ratio of from 2 to 10%.

23. The polarizing film according to claim 1, having a thickness of 5 to 80 μm.

24. A polarizing film according to claim 1, wherein the stretched film is a wet stretched film.

25. A polarizing film having an absorbance comprising an absorption peak A in a wavelength range of 550 to 650 nm and an absorption peak B in a wavelength range of 450 to 520 nm, and having an absorbance characteristics ratio (absorption peak A/absorption peak B) of no more than 1.5, wherein the absorbance peaks are measured after arranging the polarizing film in a crossed Nicol, and wherein a retardation of the film measured using a light having a wavelength of 900 nm does not exceed 1100 nm.

26. A polarizing film according to claim 25, which is of a transmission type.

27. A polarizing film according to claim 25, which is of a reflective type.

28. A polarizing film comprising a stretched film containing iodine and having a stretching ratio of no more than 50%, wherein an absorbance of said polarizing film comprises an absorption peak A in a wavelength range of 550 to 650 nm and an absorption peak B in a wavelength range of 450 to 520 nm, and an absorbance characteristics ratio (absorption peak A/absorption peak B) is no more than 1.5, wherein the absorbance peaks are measured after arranging the polarizing film in a crossed Nicol.

29. The polarizing film according to claim 28, having a stretching ratio of from 1 to 20%.

30. The polarizing film according to claim 28, having a stretching ratio of from 2 to 10%.

* * * * *